(12) United States Patent
Adkins et al.

(10) Patent No.: US 8,344,791 B2
(45) Date of Patent: Jan. 1, 2013

(54) CHARGE PUMP CIRCUITS AND METHODS

(75) Inventors: Kenneth C Adkins, Mason, OH (US); Sang Ton Ngo, San Jose, CA (US); M Abid Hussain, Los Altos, CA (US); Thomas O'Brien, Powell, OH (US); Sridhar Kotikalapoodi, Santa Clara, CA (US); George A Hall, Orangevale, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/564,456

(22) Filed: Aug. 1, 2012

(65) Prior Publication Data

US 2012/0293244 A1     Nov. 22, 2012

Related U.S. Application Data

(63) Continuation of application No. 12/868,587, filed on Aug. 25, 2010, now Pat. No. 8,258,857.

(51) Int. Cl.
    *G05F 1/10*      (2006.01)

(52) U.S. Cl. ....................................................... 327/536
(58) Field of Classification Search ................. 327/535, 327/536, 537
See application file for complete search history.

(56) References Cited

U.S. PATENT DOCUMENTS

| | | |
|---|---|---|
| 6,229,385 B1 | 5/2001 | Bell et al. |
| 7,579,902 B2 | 8/2009 | Frulio et al. |
| 7,969,231 B2 | 6/2011 | Yamahira |

*Primary Examiner* — Jeffrey Zweizig
(74) *Attorney, Agent, or Firm* — Fountainhead Law Group

(57) ABSTRACT

Embodiments of the present invention include charge pump circuits and methods. In one embodiment, a first charge pump receives a voltage and generates a first charge pump output voltage and current for supplying the power requirements of a circuit. A second charge pump is coupled in series with the first charge pump. The second charge pump generates a second charge pump output voltage and current for supplying different power requirements of the circuit. In one embodiment, the first charge pump provides a high current low voltage output to a first circuit and the second charge pump provides a low current high voltage output to a second circuit. Capacitors of the first charge pump may be external to an integrated circuit and capacitors of the second charge pump may be internal to the integrated circuit.

7 Claims, 7 Drawing Sheets

CHARGE PUMP CIRCUITS AND METHODS

CROSS REFERENCE TO RELATED APPLICATIONS

This application is a continuation of and claims priority from U.S. Non-Provisional patent application Ser. No. 12/868,587 filed Aug. 25, 2010, the contents of which is hereby incorporated herein by reference in its entirety for all purposes.

BACKGROUND

The present invention relates to electronic circuits, and in particular, to charge pump circuits and methods.

Circuits require power to operation. In electronic circuits, voltage and current must be supplied to the circuits to allow the devices in the circuit to carry out their operations. In many contemporary circuits, multiple devices performing a wide variety of functions are fabricated on a single integrated circuit ("IC" or "chip"). Typical prior art approaches to powering an integrated circuit include providing a power line, Vdd, to the integrated circuit and operating all the circuits on the IC based on external power. However, many sub-circuits of an IC may have different voltage and current requirements that may not be met with a single power line. Traditionally, it has been problematic to perform voltage and current transformations on an IC because such transformations typically require large inductors that increase the space requirements of the IC.

SUMMARY

Embodiments of the present invention pertain to charge pump circuits and methods. In one embodiment, the present invention includes a circuit comprising a first functional circuit, the first functional circuit having a first power supply voltage requirement and a first power supply current requirement, a second functional circuit, the second functional circuit having a second power supply voltage requirement and a second power supply current requirement, wherein the first power supply voltage requirement is less than the second power supply voltage requirement and the first power supply current requirement is greater than the second power supply current requirement, a first charge pump having an input coupled to a first power supply to receive a first power supply voltage, the first charge pump having a first output coupled to a first power supply input of the first functional circuit to provide a first charge pump output voltage and a first charge pump output current, wherein the first charge pump output voltage is greater than the first power supply voltage, and wherein the first charge pump output voltage meets the first power supply voltage requirement of the first functional circuit and the first charge pump output current meets the first power supply current requirement of the first functional circuit, and a second charge pump having an input coupled to at least one output of the first charge pump, the second charge pump having a second output coupled to a second power supply input of the second functional circuit to provide a second charge pump output voltage and a second charge pump output current, wherein the second charge pump output voltage is greater than the first charge pump output voltage, and wherein the second charge pump output current is less than the first charge pump output current, and wherein the second charge pump output voltage meets the second power supply voltage requirement of the second functional circuit and the second charge pump output current meets the second power supply current requirement of the second functional circuit. In one embodiment, the first functional circuit, the second functional circuit, the first charge pump, and the second charge pump are on a single integrated circuit.

In one embodiment, the first charge pump comprises a plurality of first capacitors and the second charge pump comprises a plurality of second capacitors, and wherein the first capacitors are external to the integrated circuit and the second capacitors are internal to the integrated circuit.

In one embodiment, the first charge pump is operable in a plurality of different modes comprising at least a first mode for increasing the first power supply voltage by a first amount and a second mode for increasing the first power supply voltage by a second amount.

In one embodiment, the first charge pump regulates the first charge pump output voltage.

In one embodiment, the first charge pump comprises a regulation circuit and a charge pump control circuit, wherein the charge pump control circuit generates switching signals to a plurality of transistors and a plurality of capacitors to increase the first power supply voltage, and wherein the regulation circuit disables the charge pump controller for one or more cycles to regulate the first charge pump output voltage.

In one embodiment, the second charge pump is configured in a control loop to control the second charge pump output voltage.

In one embodiment, first charge pump receives a first clock signal having a first frequency and the second charge pump receives a second clock signal having a second frequency, wherein the first frequency is less than the second frequency.

In one embodiment, second charge pump comprises a plurality of stages, each stage comprising a first transistor of first conductivity type having a first terminal coupled to receive an input voltage, a second terminal, and a control terminal, a second transistor of first conductivity type having a first terminal coupled to receive the input voltage, a second terminal, and a control terminal, a third transistor of second conductivity type having a first terminal coupled to provide an output voltage, a second terminal, and a control terminal, a fourth transistor of second conductivity type having a first terminal coupled to provide the output voltage, a second terminal, and a control terminal, a first capacitor having a first terminal coupled to receive a clock signal and a second terminal coupled to the second terminal of the first transistor, the second terminal of the third transistor, the control terminal of the second transistor, and the control terminal of the fourth transistor, and a second capacitor having a first terminal coupled to receive a complement of the clock signal and a second terminal coupled to the second terminal of the second transistor, the second terminal of the fourth transistor, the control terminal of the first transistor, and the control terminal of the third transistor.

In one embodiment, first power supply is a battery.

In one embodiment, the first power supply voltage varies across a range of voltage values, and wherein the first charge pump transitions between different modes of operation in response to different values of the first power supply voltage, and wherein different modes of operation increase the first power supply voltage by different amounts to maintain the first charge pump output voltage above a minimum voltage.

In one embodiment, the present invention includes a method comprising receiving a first power supply voltage at an input of a first charge pump from a first power supply, coupling a first charge pump output voltage and a first charge pump output current from a first output of the first charge pump to a first power supply input of a first functional circuit, the first functional circuit having a first power supply voltage requirement and a first power supply current requirement, wherein the first charge pump output voltage is greater than the first power supply voltage, and wherein the first charge pump output voltage meets the first power supply voltage requirement of the first functional circuit and the first charge pump output current meets the first power supply current requirement of the first functional circuit, and receiving at least one output of the first charge pump at an input of a second charge pump, the second charge pump generating a second charge pump output voltage and a second charge pump output current on a second output of the second charge pump, wherein the second charge pump output voltage is greater than the first charge pump output voltage, and wherein the second charge pump output current is less than the first charge pump output current, coupling the second charge pump output voltage and the second charge pump output current to a second power supply input of a second functional circuit, the second functional circuit having a second power supply voltage requirement and a second power supply current requirement, wherein the first power supply voltage requirement is less than the second power supply voltage requirement and the first power supply current requirement is greater than the second power supply current requirement, and wherein the second charge pump output voltage meets the second power supply voltage requirement of the second functional circuit and the second charge pump output current meets the second power supply current requirement of the second functional circuit. In one embodiment, the first functional circuit, the second functional circuit, the first charge pump, and the second charge pump are on a single integrated circuit.

In one embodiment, the first charge pump couples signals to a plurality of first capacitors and the second charge pump couples signals to a plurality of second capacitors, and wherein the first capacitors are external to the integrated circuit and the second capacitors are internal to the integrated circuit.

In one embodiment, the first charge pump is operable in a plurality of different modes comprising at least a first mode for increasing the first power supply voltage by a first amount and a second mode for increasing the first power supply voltage by a second amount.

In one embodiment, the method further comprises, regulating, by the first charge pump, the first charge pump output voltage.

In one embodiment, regulating comprises skipping one or more charge pump cycles.

In one embodiment, the method further comprises regulating the second charge pump output voltage.

In one embodiment, the first charge pump receives a first clock signal having a first frequency and the second charge pump receives a second clock signal having a second frequency, wherein the first frequency is less than the second frequency.

In one embodiment, the present invention includes a circuit comprising a first sub-circuit, the first sub-circuit having a first power supply voltage requirement and a first power supply current requirement, a second sub-circuit, the second sub-circuit having a second power supply voltage requirement and a second power supply current requirement, wherein the first power supply voltage requirement is less than the second power supply voltage requirement and the first power supply current requirement is greater than the second power supply current requirement, first means for increasing a first power supply voltage received from a first power supply, said first means having a first output coupled to a first power supply input of the first sub-circuit to provide a first output voltage and a first output current, wherein the first output voltage is greater than the first power supply voltage, and wherein the first output voltage meets the first power supply voltage requirement of the first sub-circuit and the first output current meets the first power supply current requirement of the first sub-circuit, and second means for increasing the first output voltage coupled to the first output of the first means, the second means having a second output coupled to a second power supply input of the second sub-circuit to provide a second output voltage and a second current, wherein the second output voltage is greater than the first output voltage, and wherein the second output current is less than the first output current, and wherein the second output voltage meets the second power supply voltage requirement of the second sub-circuit and the second output current meets the second power supply current requirement of the second sub-circuit. In one embodiment, the first sub-circuit, the second sub-circuit, the first means, and the second means are on a single integrated circuit.

In one embodiment, the first means comprises a plurality of first capacitors and the second means comprises a plurality of second capacitors, and wherein the first capacitors are external to the integrated circuit and the second capacitors are internal to the integrated circuit.

In one embodiment, the first means is a charge pump comprising a plurality of series connected transistors and a plurality of capacitors between said transistors.

In one embodiment, the second means is a charge pump comprising a plurality of charge pump stages, each stage comprising a first transistor of first conductivity type having a first terminal coupled to receive an input voltage, a second terminal, and a control terminal, a second transistor of first conductivity type having a first terminal coupled to receive the input voltage, a second terminal, and a control terminal, a third transistor of second conductivity type having a first terminal coupled to provide an output voltage, a second terminal, and a control terminal, a fourth transistor of second conductivity type having a first terminal coupled to provide the output voltage, a second terminal, and a control terminal, a first capacitor having a first terminal coupled to receive a clock signal and a second terminal coupled to the second terminal of the first transistor, the second terminal of the third transistor, the control terminal of the second transistor, and the control terminal of the fourth transistor, and a second capacitor having a first terminal coupled to receive a complement of the clock signal and a second terminal coupled to the second terminal of the second transistor, the second terminal of the fourth transistor, the control terminal of the first transistor, and the control terminal of the third transistor.

The following detailed description and accompanying drawings provide a better understanding of the nature and advantages of the present invention.

DETAILED DESCRIPTION

Described herein are techniques for charge pump circuits and methods. In the following description, for purposes of explanation, numerous examples and specific details are set forth in order to provide a thorough understanding of the present invention. It will be evident, however, to one skilled in the art that the present invention may include some or all of the features in these examples alone or in combination with other features described below, and may further include modifications and equivalents of the features and concepts described herein.

Figure 1:
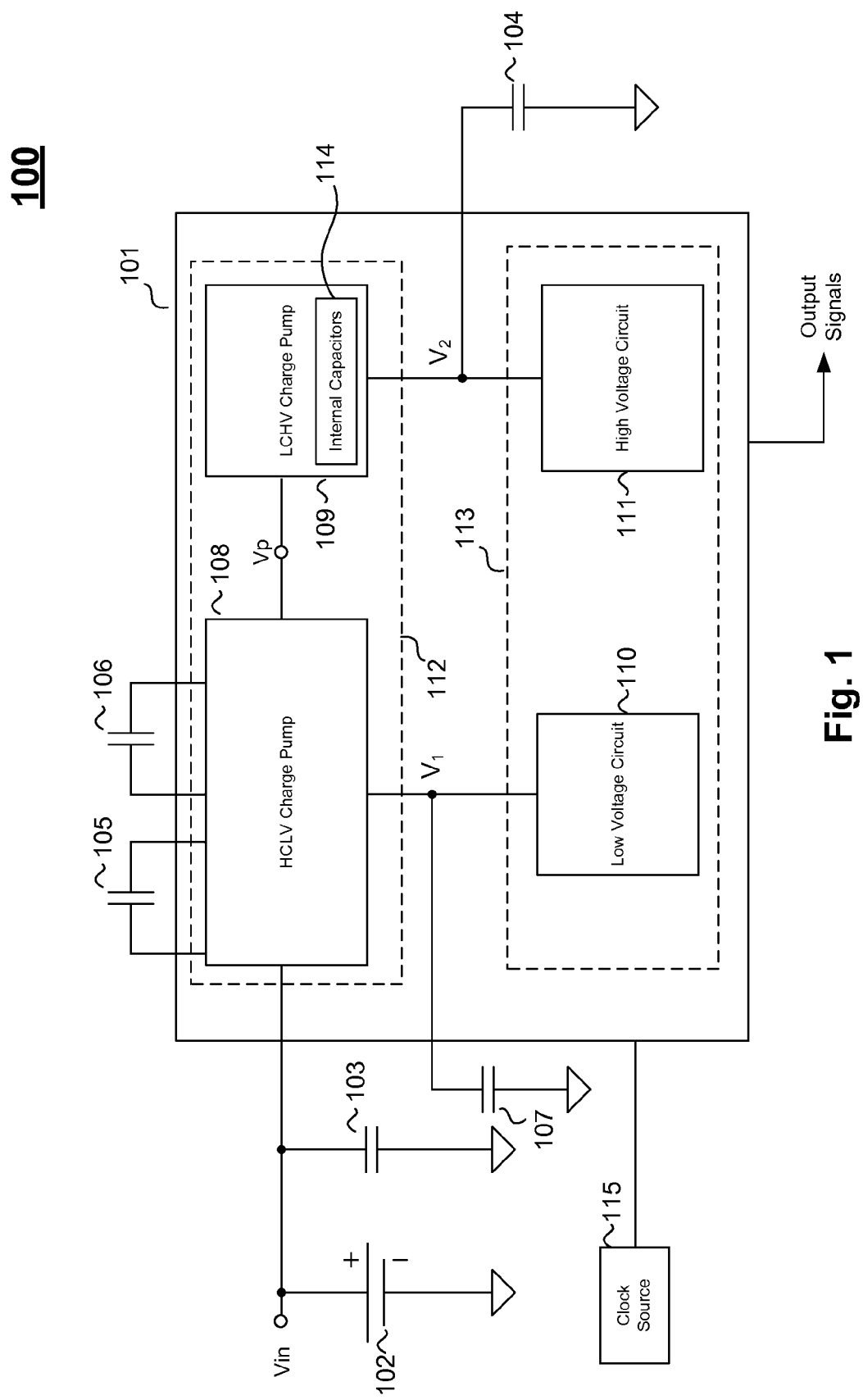
FIG. 1 illustrates a charge pump system according one embodiment of the present invention.

FIG. 1 illustrates a charge pump system 100 according one embodiment of the present invention. In this example, a charge pump system 100 includes integrated circuit 101 (or "chip") including charge pump power conditioning circuit 112 and sub-circuit 113. Sub-circuit 113 may multiple different power supply voltage and current requirements for proper operation. Charge pump power conditioning circuit 112 converts a power supply voltage Vin into multiple different voltages and currents to meet the different requirements of sub-circuit 113. In this example, charge pump power conditioning circuit 112 includes charge pumps 108 and 109 and sub-circuit 113 includes a first functional circuit 110 and a second functional circuit 111. Functional circuit 110 may have a particular power supply voltage requirement and a particular power supply current requirement, and functional circuit 111 may have a different power supply voltage requirement and a different power supply current requirement. For example, functional circuit 110 may have a minimum operating voltage requirement of 8 volts and it may draw up to 30 mA, whereas functional circuit 111 may have a minimum operating voltage requirement of 32 volts and it may draw up to 1 mA. Features and advantages of the present invention include receiving a power supply input and transforming the power supply voltage to different voltage levels using charge pumps 108 and 109 with different charge pump output currents that meet the voltage and current requirements of different sub-circuits in the system.

Charge pump 108 includes capacitors 105 and 106, and charge pump 109 includes capacitors 114. In this example, capacitors 105 and 106 are external to the integrated circuit and capacitors 114 are internal to the integrated circuit. External capacitors may have larger capacitance values to increase the current capability of the charge pump, but are still advantageously small compared to inductors used in typical power conversion systems, thereby reducing the space used around the integrated circuit in an electronic application such as a smart phone, for example. Circuit 100 further includes reservoir capacitors 104 and 107 and clock source 115. In this example, charge pumps 108 and 109 are configured in series. Further, in this particular implementation, the external power supply is a battery 102. Battery 102 provides voltage Vin and clock source 115 provides an input clock signal to integrated circuit 101. Capacitor 103 provides DC bypass for power supply input voltage Vin and aids in keeping the voltage at the input of integrated circuit 101 constant, and capacitors 104 and 107 may be included in some applications to provide bypass to intermediate nodes within integrated circuit 101 at the outputs of the two charge pumps.

In this example, functional circuit 110 has a high current low voltage requirement relative to functional circuit 111, and functional circuit 111 has a low current high voltage requirement relative to functional circuit 110. Accordingly, in this example charge pump 108 is referred to as a high current low voltage (HCLV) charge pump and charge pump 109 is referred to as a low current high voltage (LCHV) charge pump. Functional circuit 110 and 111 may be distinctly different components or they may have overlapping components or even the same components that have different voltage and current requirements in different modes of operation. Capacitors 105-106 provide charge storage for high current low voltage (HCLV) charge pump 108. As mentioned above, capacitors 105-106 may be external to an integrated circuit package, for example, and coupled to charge pump 108 through a pin or other electrical contact on the integrated circuit package. The electrical contact is, in turn, electrically coupled to an electrical contact on the integrated circuit. Charge pump system 100 provides internal power conditioning for a combination of circuitry that has low voltage and high voltage requirements by using a charge pump configuration that reduces component footprint.

Battery 102 may be a lithium ion battery providing input voltage Vin. Integrated circuit 101 may be designed to receive a large range of input voltages, Vin, such as 2.8 v to 5.5 v, for example. Different embodiments of the present invention may receive a power supply input voltage and use charge pumps to increase or decrease the power supply input voltage to produce a variety of different charge pump output voltages with voltage levels and currents to meet the needs of different sub-circuits on an integrated circuit. In this example, the power supply voltage is increased (e.g., from a range of 2.8-5.5 v up to 8 v at 30 mA and 32 v at 1 mA). Capacitors 103-107 may be on the order of 0.1 uF in one embodiment. Clock source 115 may provide a 6 MHz clock signal that integrated circuit 101 uses to create a plurality of clock sources for different uses within the chip. In one embodiment described in more detail below, different charge pumps are clocked at different frequencies to advantageously reduce switching losses. Integrated circuit 101 may, in one example implementation, utilize a complementary metal-oxide-semiconductor ("CMOS") process, which may include an analog and digital circuit (e.g., mixed signal) process that may have highly compact circuit cells to produce a small die size. This small dies size may provide a small footprint on a printed circuit board or substrate. Integrated circuit 101 charge pumps 108 and 109 may use a plurality of internal capacitors 114 as well as a limited number and size of external capacitors (e.g. capacitors 105-106) to generate increased voltages with reduced die size footprints to satisfy distinct power requirements within the chip.

Features and advantages of the present invention include partitioning functional circuitry 112 according to voltage and current (power) requirements and supplying power to different circuits with different voltage and current requirements from different charge pumps. This example includes a low voltage circuit 110 and high voltage circuit 111. Low voltage circuit 110 may require more current than high voltage circuit 111, for example. In this example, HCLV charge pump 108 has an input coupled to a battery power supply to receive power supply voltage Vin and provide a first up conversion of voltage Vin. HCLV charge pump 108 generates a voltage V1 (V1>Vin) provided on a charge pump output that is coupled to a power supply input of low voltage circuit 110. Accordingly, charge pump 108 supplies the low voltage circuit 110 with power. Charge pump 108 may include larger capacitors to generate more current, and the capacitors may be external to the integrated circuit, for example. Power circuit 112 also includes low current high voltage (LCHV) charge pump 109 coupled in series with HCLV charge pump 108. LCHV charge pump 109 receives a voltage Vp from HCLV charge pump 108 and provides a second up conversion from the output voltage Vp of HCLV charge pump 108 to produce a voltage V2 that is greater than voltage Vp. Voltage Vp may be, but not necessarily must be, the same voltage as voltage V1, for example. LCHV charge pump 109 has an output coupled to the power supply input of high voltage circuit 111 to supply power (voltage and current). In this example, high voltage circuit 111 has a higher voltage requirement but a lower current requirement. Thus, LCHV charge pump 109 may include capacitors 114 that are entirely internal, and thereby reduce the circuit board footprint of the system. For example, low voltage circuit 110 may require 30 ma at 5-8V in order to operate properly, and high voltage circuit 111 may require 1 ma at 32V. Integrated circuit 101 may provide output signals having voltages which correspond to the current and voltage requirements of the low voltage circuit 110 and high voltage circuit 111, for example.

Figure 2:
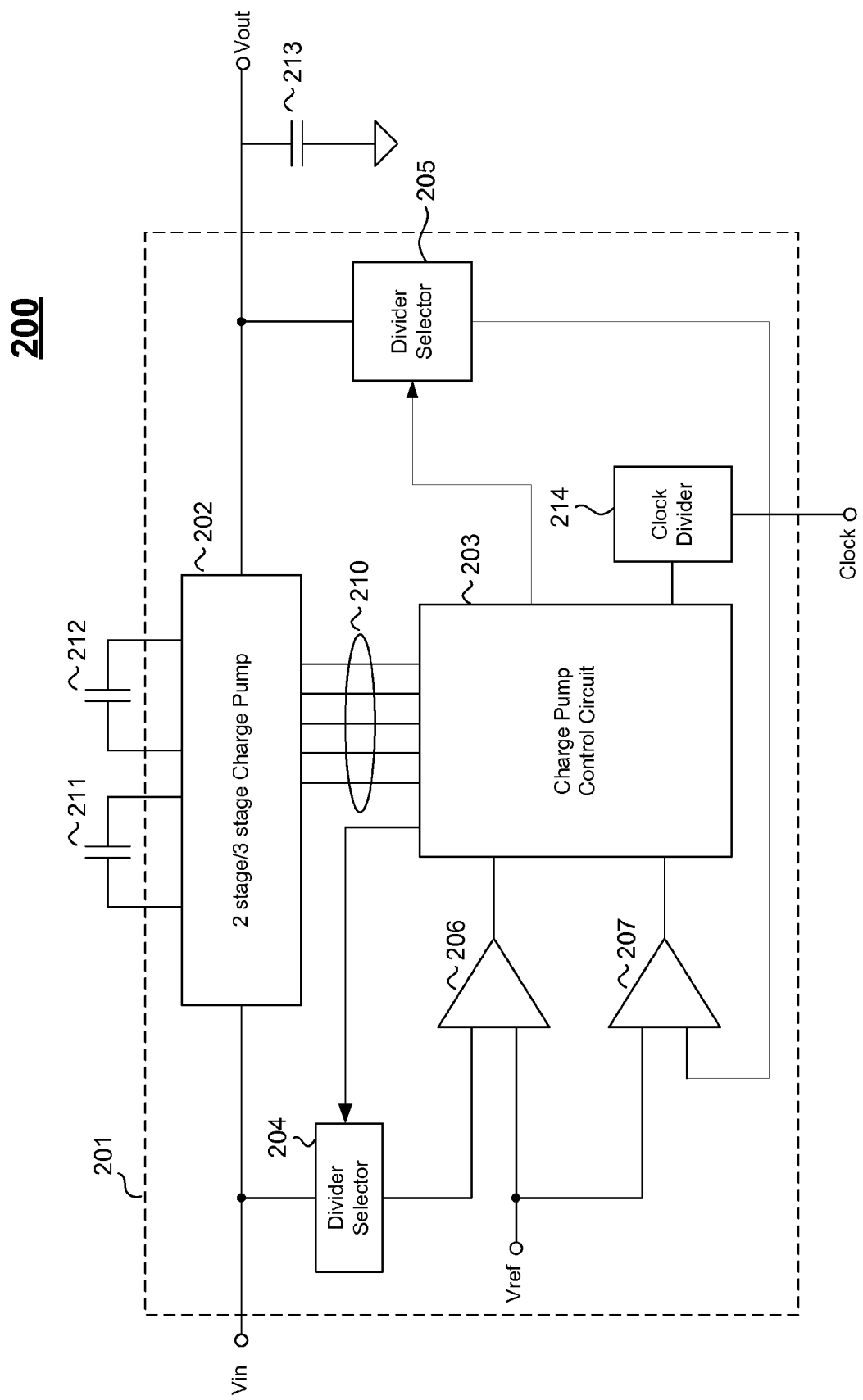
FIG. 2 illustrates a HCLV charge pump circuit according to one embodiment of the present invention.

FIG. 2 illustrates a HCLV charge pump circuit 200 according to one embodiment of the present invention. In this example implementation, HCLV charge pump circuit 200 includes integrated circuitry 201, which may be integrated on a single semiconductor substrate, for example. Circuit 200 includes external flying capacitors 211-212 and a reservoir capacitor 213. HCLV charge pump circuit 200 receives voltage Vin and provides a desired voltage Vout. In this example, charge pump stages 202 may be configured (e.g., programmed) to double or triple the input voltage using two or three stages of charge pumping. If the switching signals used to pump charge within the charge pump stages have a voltage comparable with Vin, charge pump stages 202 may provide a doubling or tripling of the input voltage Vin depending on whether 2 stages or 3 stages are selected for the conversion.

Charge pump stages 202 use flying capacitors 211-212 during charge pump operation. Reservoir capacitor 213 may be on the same order of magnitude in value as capacitors 211-212. However, in other embodiments, reservoir capacitor 213 may be several orders of magnitude greater in value than flying capacitors 211-212 to reduce ripple at the output voltage Vout, for example.

A clock divider circuit 214 may receive and divide down the frequency of the clock signal. Clock divider circuit 214 may provide a charge pump control circuit 203 with a lower frequency clock signal such as 750 KHz, for example. In some implementations, higher current outputs of charge pump may need larger transistors and larger capacitances, which may lead to higher switching losses. Accordingly, different charge pumps in the system may use different frequency clocks to control the switching cycles to advantageously reduce switching losses. Charge pump control circuit 203 provides a plurality of switching signals 210 derived from the clock signal provided by clock divider circuit 214. Charge pump stages 202 receive the plurality of switching signals 210 to switch the state of transistors and the flying capacitors 211-212 as described in detail below.

Charge pump circuit 200 receives an input voltage Vin and generates a boosted voltage Vout that is greater than Vin. In one embodiment, charge pump circuit 200 may include a circuit coupled to the input to configure charge pump stages 202 between doubler mode and tripler mode to ensure that the output voltage Vout does not drop below a minimum output voltage. In this example, circuit 200 includes a divider selector 204 coupled to the input voltage Vin, a comparator 206, and circuitry in charge pump control circuit 203 to configure charge pump stages 202 between doubler mode and tripler mode based on the input voltage Vin to provide an output voltage Vout above a minimum desired output voltage, for example. Divider selector 204 may comprise a voltage divider having digitally controlled switchable taps. The input voltage Vin may be received at one terminal of the resistor divider and one of the switchable taps may be digitally selected to output a divided version of voltage Vin. The divider value (e.g., Vo/Vin) may be controlled by digital signals from charge pump control circuit 203. The divided output voltage from divider selector 204 is coupled to one input of comparator 206. Another input of comparator 206 is coupled to a reference voltage Vref.

If the input voltage Vin causes the output voltage of the divider selector 204 to be below Vref, then an output of comparator 206 may send a signal to charge pump control circuit 203 to configure the charge pump in tripler mode so that the output voltage Vout is not less than the minimum desired output voltage Vout, min. This situation may occur if the input voltage is low (e.g., at the lower bound of a required input voltage specification), such that the charge pump stages 202 must be in tripler mode to produce a voltage Vout that is at or above the minimum desired output voltage.

Similarly, if the input voltage Vin causes the output voltage of the divider selector 204 to be above Vref, then an output of comparator 206 may send another signal to charge pump control circuit 203 to configure the charge pump in doubler mode so that the output voltage Vout meets a desired output voltage. This situation may occur if the input voltage is too high (e.g., at the higher bound of a required input voltage specification), such that the charge pump stages 202 may be in doubler mode to produce a voltage Vout that is at or above the desired output voltage. In one embodiment, if a programmable resistor divider is used, a first tap may be selected for comparing with Vref when transitioning from doubler to tripler mode and a second tap may be selected for comparing with Vref when transitioning from tripler to doubler mode. Specifically, Vin may be divided by a smaller value when in doubler mode so that the transition to tripler mode happens before Vin is too small (where Vin is decreasing), and Vin may be divided by a larger value when in tripler mode so that the transition to double mode happens before Vin becomes too large (where Vin is increasing), for example. Accordingly, hysteresis is introduced into the transitions between modes. For example, the divider selector 204 may be configured to trigger comparator 206 to cause the system to switch from doubler to tripler mode when the input voltage Vin is at 5V, but the divider selector 204 may be configured to trigger comparator 206 to cause the system to switch from tripler to doubler mode when the input voltage Vin is at 4.5V. This approach uses a hysteresis in the threshold voltages used for switching between doubler and tripler modes to prevent chattering between the doubler and tripler modes when the input voltage Vin is near a transition boundary. Example values of the input voltages and output voltages for one example implementation are as follows. The input voltage Vin may range between 2.8V to 5.5V. The output voltage Vout may range from 5.5V to 8.5V with a maximum output current of 30 mA, for example. It is to be understood that an actual implementation may include voltage losses that account for the non-idealities between the input range, the gain (e.g., ×2, ×3), and the output range.

HCLV charge pump 200 may also have a regulator mode to more accurately provide a desired output voltage by providing feedback of output voltage Vout. In one embodiment, a desired voltage for Vout may be preprogrammed into the charge pump control circuit 203 and the system may generate a regulated voltage. Divider selector 205 provides a scaled feedback voltage of output voltage Vout. An output of divider selector 205 is coupled to one input terminal of comparator 207. The other input terminal of comparator 207 is coupled to receive a reference voltage Vref. Comparator 207 may be coupled to the same or different Vref as comparator 206. A single Vref is shown here for illustrative purposes. In regulated mode, charge pump control circuit 203 may select a tap point of divider selector 205 corresponding to the desired output voltage. When Vout exceeds a threshold set by divider selector 205, comparator 207 may change state and charge pump control circuit 203 may disable one cycle or a plurality of cycles of the switching signals 210 in order to reduce the charge transferred by charge pump stages 202 to the output. In one embodiment, the plurality of switching signals 210 for charge pump stages 202 may be disabled until the output voltage Vout on the output terminal of HCLV charge pump 200 drops below a particular value. Accordingly, comparator 206 may track Vin to configure the charge pump stages 202 in doubler or tripler modes and thereby set Vout, and comparator 207 may track Vout to selectively disable clock cycles to limit Vout to obtain the desired output voltage.

Figure 3:
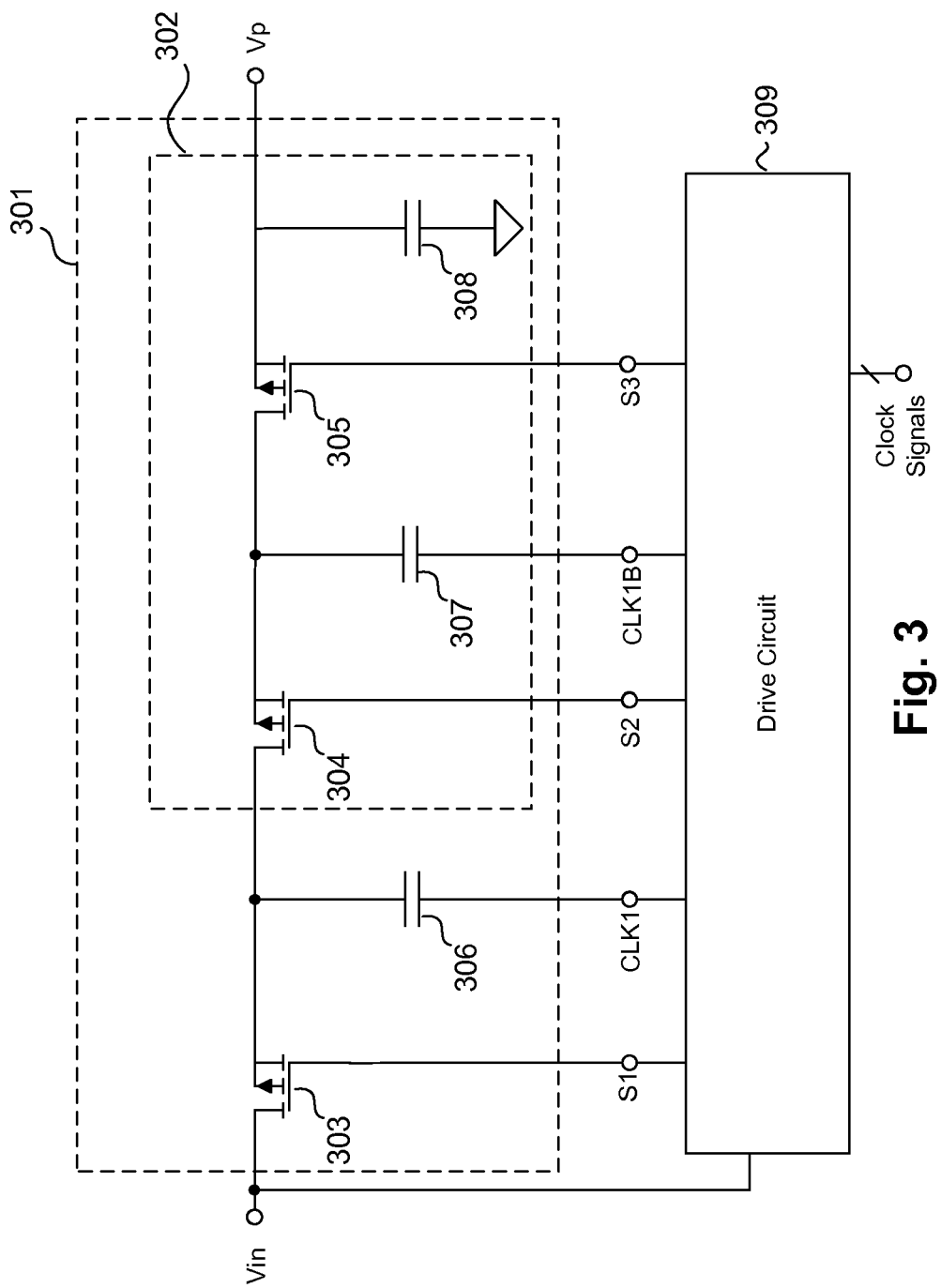
FIG. 3 illustrates a charge pump circuit according to one embodiment of the present invention.

FIG. 3 illustrates a charge pump stage circuit 300 according to one embodiment of the present invention. Charge pump stage circuit 300 includes transistors 303-305 coupled in series having capacitors 306-308 configured between the channels of the transistors 303-305. A drive circuit 309 may provide drive signals to the control terminals of transistors 303-305 and to the terminals of flying capacitors 306-307. In one embodiment, a voltage tripler circuit 301 may include a voltage doubler circuit 302 that may function as described above. In this embodiment, the doubler circuit 302 includes transistors 304-305 and external capacitors 307-308, and the tripler circuit 301 includes the doubler circuit plus transistor 303 and capacitor 306.

In doubler mode, a signal, S1 (e.g., a voltage signal), may be coupled to the control terminal of transistor 303 to turn on transistor 303 to couple voltage Vin to one terminal of transistor 304. CLK1 may also be set to a low voltage (e.g., ground). In a first phase of operation, signal CLK1B which is coupled to one terminal of external capacitor 307 may go to a low voltage such as 0V, for example. Then, signal S2 switches transistor 304 to the on state such that the charge supplied from voltage Vin transfers to capacitor 307. In the next phase of operation, signal S2 switches transistor 304 into an off state and signal CLK1B changes to a high state. If the high state voltage of signal CLK1B is equal to voltage Vin, then the circuit doubles the voltage on capacitor 307. In the next phase of operation, signal S3 switches transistor 305 from an off state to an on state such that charge is transferred from capacitor 307 to reservoir capacitor 308. The cycle may repeat such that charge is transferred from Vin to capacitor 307, increased (pumped up), and then transferred to the output Vp. In this example, CLK1B doubles the voltage level on capacitor 307, and then the charge is transferred to the output.

In tripler mode, signals S1-S3, CLK1, and CLK1B operate to increase (pump) Vin to Vp through three stages such that Vp=3×Vin. In a first phase of operation, signal S2 switches transistor 304 into an off (or blocking) state, signal CLK1 which is coupled to one terminal of external capacitor 306, may be changed to a low voltage such as 0V, and CLK1B, which is coupled to one terminal of external capacitor 307, may change to a high voltage such as Vin, for example. CLK1B may be the complementary signal (or inverse) of CLK1. Then signal S1 switches transistor 303 to the on state such that the voltage Vin transfers to capacitor 306, and signal S3 switches transistor 305 to an on state such that charge is transferred from capacitor 307 to reservoir capacitor 308. During a second phase, signals S1 and S3 switch transistors 303 and 305 to an off state, respectively. Then, signal CLK1 changes to a high state (e.g., Vin) such that double the voltage is now available on capacitor 306 for transfer, and signal CLK1B changes to a low state. Then, signal S2 switches transistor 304 to an on state such that pumped voltage is transferred from capacitor 306 to capacitor 307. The first phase may repeat such that CLK1B adds an additional voltage comparable to Vin to the voltage across capacitor 307 such that 3×Vin is transferred when signal S3 switches transistor 305 into the on state and the charge is transferred to reservoir capacitor 308. The cycle may continue to repeat, where charge is transferred from voltage Vin to capacitor 308, where CLK1 adds a voltage level comparable to voltage Vin during the first phase and CLK1B adds a voltage level comparable to Vin during the second phase of operation.

Figure 4:
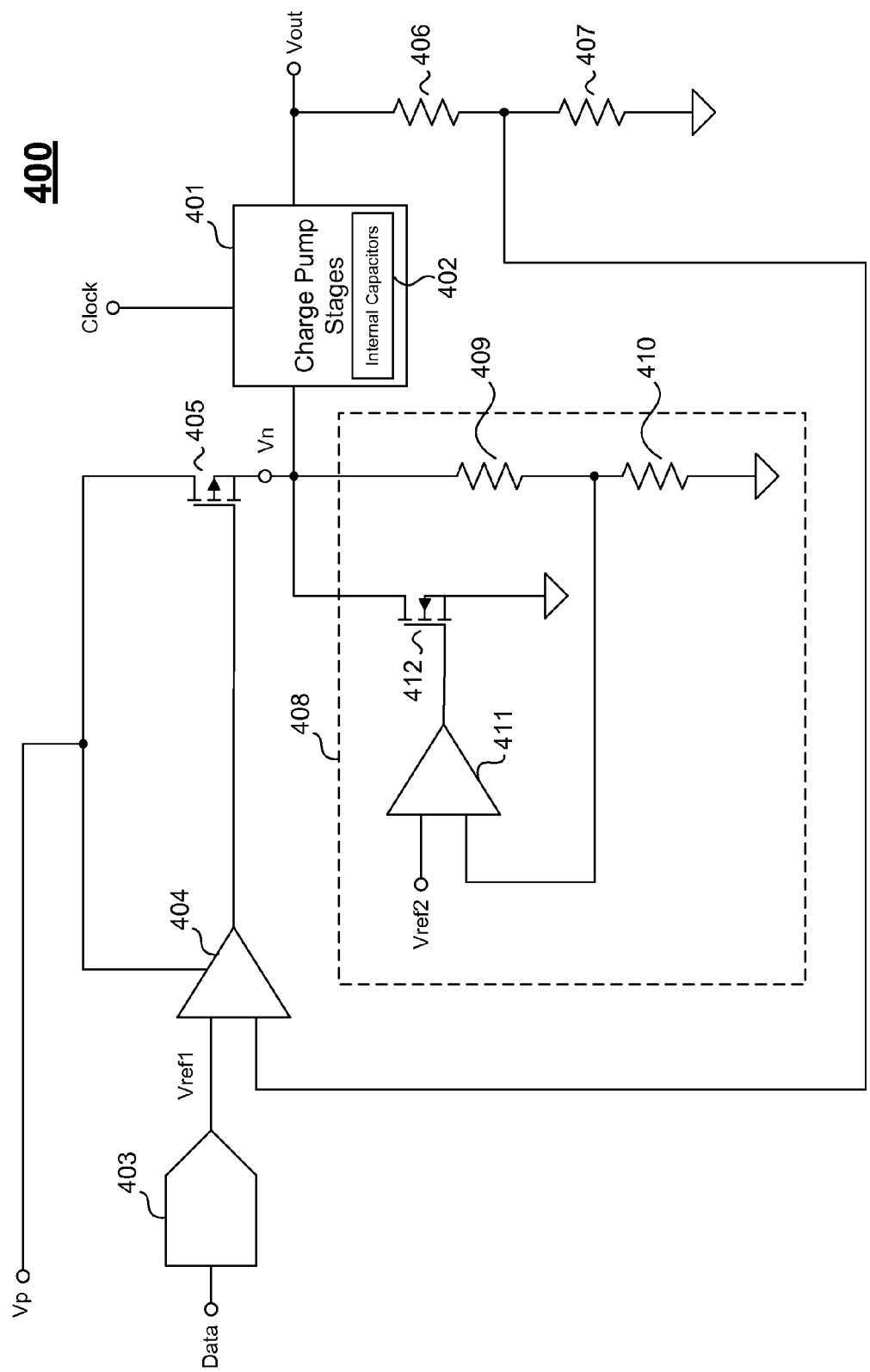
FIG. 4 illustrates a LCHV charge pump circuit according to one embodiment of the present invention.

FIG. 4 includes an LCHV charge pump circuit 400 according to one embodiment of the present invention. LCHV charge pump circuit 400 includes charge pump stages 401 having a set of internal capacitors 402. This example includes a control loop around charge pump stages 401 comprising resistors 406-407, amplifier 404, transistor 405, DAC 403 and voltage clamp 408. The control loop allows LCHV charge pump circuit 400 to provide a regulated output voltage, for example.

Amplifier 404 receives a voltage provided by DAC 403 in response to data provided at the input of DAC 403. This voltage Vref1 is compared with a feedback voltage provided by an intermediate node between resistor 406 and 407 configured as a voltage divider of the voltage Vout. The output terminal of amplifier 404 is coupled to a control terminal of transistor 405. One terminal of transistor 405 and a power supply terminal of amplifier 404 are couple to receive voltage Vp (e.g., from a previous HCLV charge pump stage). The other terminal of transistor 405 is coupled to voltage clamp 408 and the plurality of charge pump stages 401. The plurality of charge pump stages 401 provides output voltage Vout. The amplifier 404 drives transistor 405 to provide charge to the plurality of charge pump stages such that output voltage Vout corresponds to voltage Vref1 set by DAC 403 and the data provided.

Voltage clamp 408 clamps the voltage Vn to protect the internal structures of the plurality of charge pump stages 401 from exceeding a maximum voltage level. For example, if the plurality of charge pump stages 401 provides for a 7×Vn increase from the input to output, and if voltage clamp 408 clamps Vn to 6V, then Vout may be limited to 42V. If the process has an absolute maximum voltage of 52V then voltage clamp 408 has improved the reliability of LCHV charge pump circuit 400 by ensuring that the output does not exceed the maximum voltage of the process, for example.

Voltage clamp 408 includes another control loop comprising resistors 409-410, amplifier 411, and transistor 412. Resistors 409-410 are coupled in a voltage divider configuration and provide a scaled down voltage to one input of amplifier 411. A second input of amplifier 411 is coupled to receive a voltage Vref2. An output terminal of amplifier 411 drives a control terminal of transistor 412 such that when the voltage at the intermediate node between resistors 409 and 410 exceeds or is approximately equal to Vref2, transistor 412 turns on to sink current and not allow voltage Vn to increase further. The voltage Vn is clamped based on the values of Vref2 and resistors 409-410.

Figure 5:
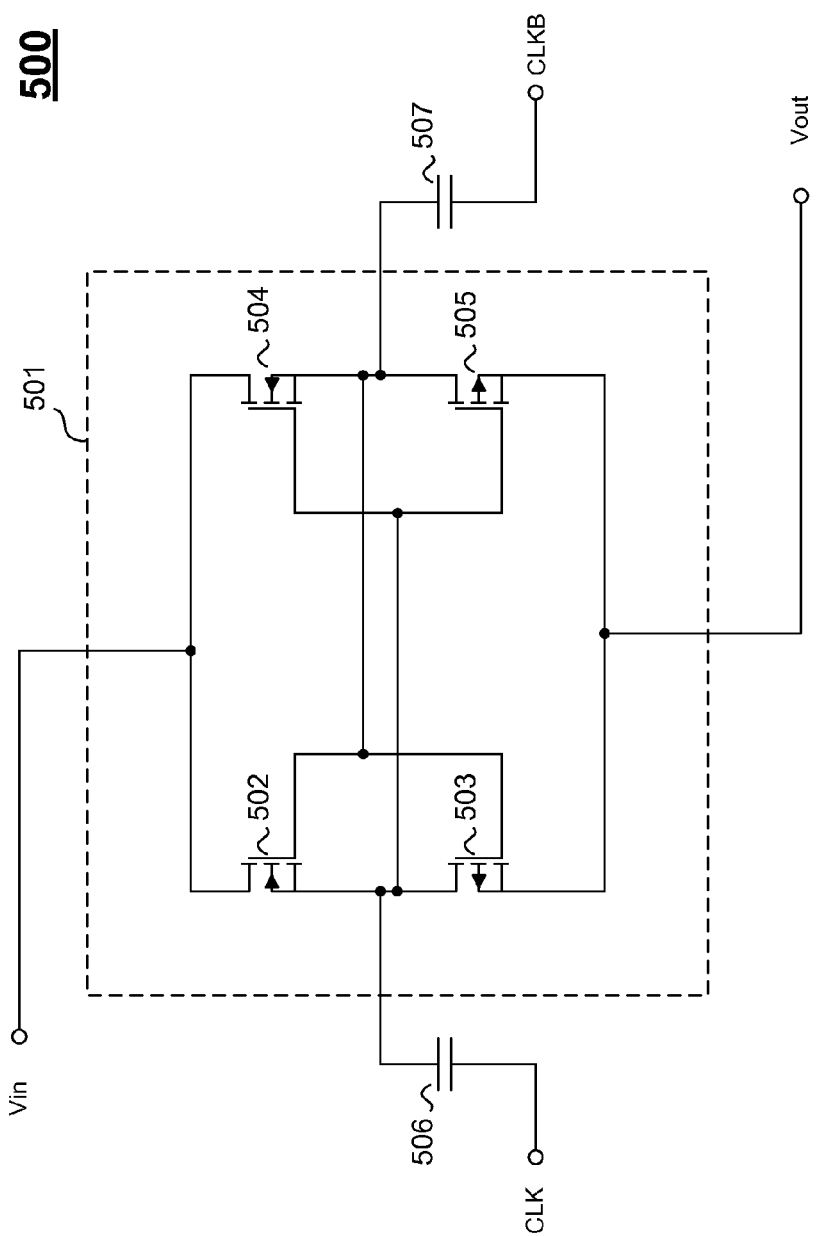
FIG. 5 illustrates a charge pump stage according to one embodiment of the present invention.

FIG. 5 illustrates a stage circuit 500 of the plurality of charge pump stages 401 of FIG. 4 according to one embodiment of the present invention. Stage circuit 500 includes a complimentary charge pump circuit 501 and capacitors 506-507. Complimentary charge pump circuit 501 includes complimentary transistors 502-503 and 504-505. Transistors 502 and 504 may be NMOS (N-channel Metal-Oxide-Semiconductor) devices and transistors 503 and 505 may be PMOS (P-channel Metal-Oxide-Semiconductor) devices. Transistors 502-503 are configured in series as alternately activated pass gates (e.g., switches) having their control terminals capacitively coupled through capacitor 507 to receive signal CLKB. The source terminals of transistors 502 and 503 are coupled together and to the control terminals of transistors 504 and 505. Transistors 504-505 are configured in series as alternately activated pass gates (e.g., switches) having their control terminals capacitively coupled through capacitor 506 to receive signal CLK. The source terminals of transistors 504 and 505 are coupled together and to the control terminals of transistors 502 and 503. The drain terminals of transistors 502 and 504 are coupled to receive voltage Vin, and the drain terminals of transistors 503 and 505 are coupled to deliver voltage Vout. Stage circuit 500 is an example of the one stage of the plurality of charge pump stages 401. CLK and CLKB may be non-overlapping complimentary clock signal running at a frequency greater than the frequency of the clock signals operating the LCHV charge pump, for example (e.g., 6 Mhz).

In a first phase of operation, signal CLK transitions to a high state with a voltage level Vck, which in one example implementation may be equal to the input voltage, Vn, to the charge pump stages 401, for example. Accordingly, at the first charge pump stage, the voltage across capacitor 506 increases by Vck. If the voltage on the intermediate node between the sources of transistors 502 and 503 is set to Vn on a previous cycle in the first stage as described below (or Vin in subsequent stages), then the voltage on the intermediate node between the sources of transistors 502 and 503 is increased by Vck when CLK goes high. The resulting voltage is Vn+Vck, or 2×Vn if Vck=Vn in the first stage. Further, signal CLKB transitions to a low state which switches transistor 503 into the on state and charge from capacitor 506 is transferred to Vout1. Also, the transitioning of signal CLK to a high state switches transistor 504 to an on state and charge is transferred from Vin to capacitor 507.

In the second phase of operation, signal CLK transitions to a low state which switches transistor 505 into the on state and charge from capacitor 507 to transfer charge to Vout1. Signal CLKB transitions to a high state with a voltage level Vck, and the voltage across capacitor 507 increases. Also, the transitioning of signal CLKB to a high state switches transistor 502 to an on state and charge transfers from Vin to capacitor 506. Stage circuit 500 increases the input voltage by an amount equal to the clock voltage level at each stage.

Figure 6A:
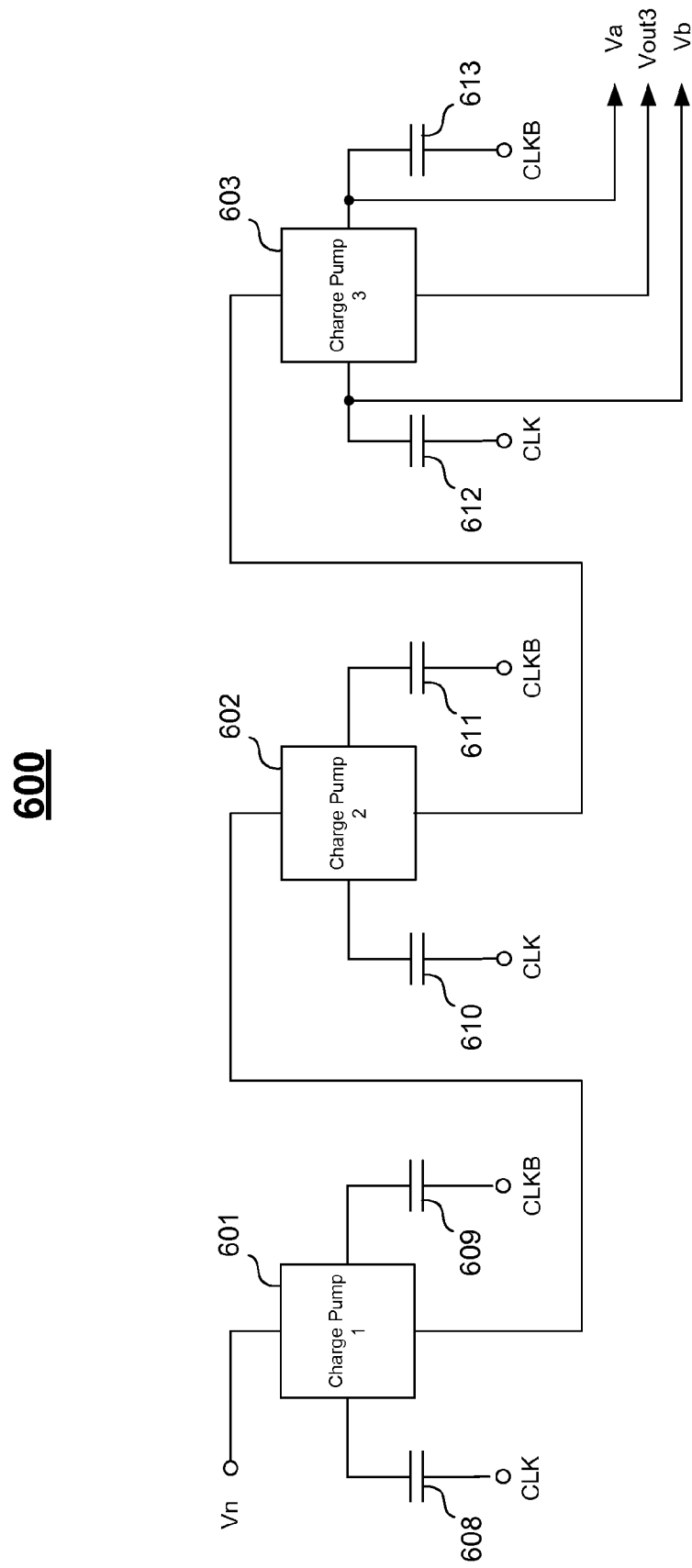
FIGS. 6A and 6B illustrate plurality of charge pump stages according to one embodiment of the present invention.
Figure 6B:
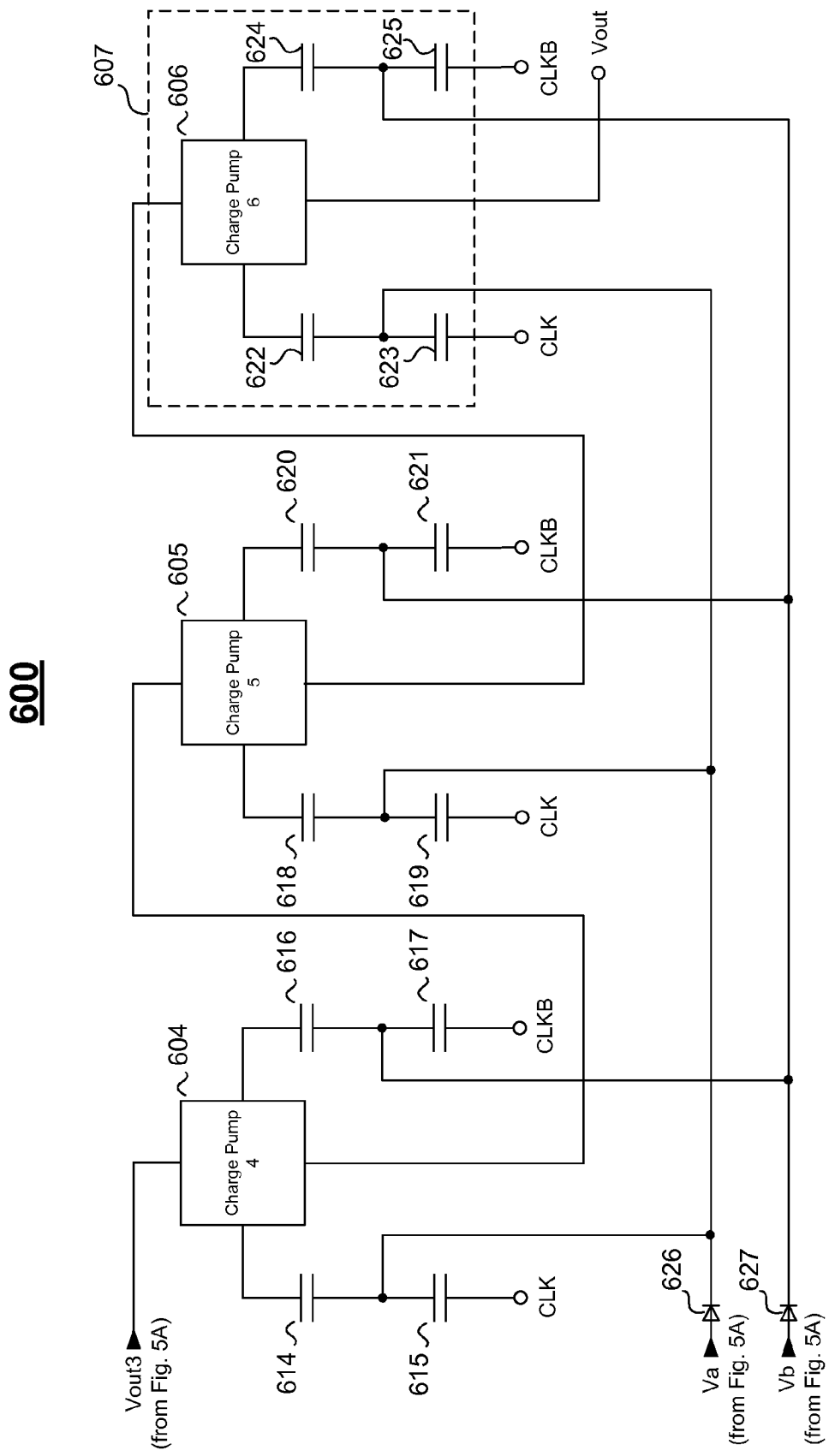

FIGS. 6A and 6B illustrate a plurality of charge pump stages 600 according to one embodiment of the present invention. Charge pump stages 600 includes stages 601-606 coupled in series. Capacitors 608-625 are used for storing charge on stages 601-606. Capacitors 608-625 may be manufactured on the same substrate as the transistors and other circuits of an integrated circuit, for example. Charge pump 601 with capacitors 608-609, charge pump 602 with capacitors 610-611, charge pump 603 with capacitors 612-613, charge pump 604 with capacitors 614-617, charge pump 605 with capacitors 618-621, and charge pump 606 with capacitors 622-625 are each coupled in a similar manner as charge pump circuit 501 and capacitors 506-507 of FIG. 5. These charge pump stages are coupled in series to provide a 6×Vck increase to the charge pump input voltage, Vn, at the output of the charge pump to produce an output voltage, Vout.

In this embodiment, plurality of charge pump stages 600 provides series configured capacitors 614-625 of FIG. 6B that divide charge and allow for an integrated circuit not to exceed a maximum allowable capacitor voltage. Charge pump 603 of FIG. 6A provides voltage Va and voltage Vb to the charge pump stages of FIG. 6B. Charge pump 603 provides voltage Va from a terminal coupled to capacitor 612 and voltage Vb from a terminal coupled to capacitor 613. Voltage Va is coupled through diode 626 to an intermediate node of each set of series configured capacitors 614-615, 618-619, and 622-623. These series configured capacitors are coupled to corresponding terminals of charge pump stages 604-607. Voltage Vb is coupled through diode 627 to an intermediate node of each set of series configured capacitors 616-617, 620-621, and 624-625. These series configured capacitors are coupled to corresponding terminals of charge pump stages 604-607.

The voltage Va and Vb pre-charge the series configured capacitors such that the charge is divided. Dividing the charge may be important to limit the maximum voltages across the integrated capacitors.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   receiving a first power supply voltage at an input of a first charge pump from a first power supply;
   coupling a first charge pump output voltage and a first charge pump output current from a first output of the first charge pump to a first power supply input of a first functional circuit, the first functional circuit having a first power supply voltage requirement and a first power supply current requirement, wherein the first charge pump output voltage is greater than the first power supply voltage, and wherein the first charge pump output voltage meets the first power supply voltage requirement of the first functional circuit and the first charge pump output current meets the first power supply current requirement of the first functional circuit; and
   receiving at least one output of the first charge pump at an input of a second charge pump, the second charge pump generating a second charge pump output voltage and a second charge pump output current on a second output of the second charge pump, wherein the second charge pump output voltage is greater than the first charge pump output voltage, and wherein the second charge pump output current is less than the first charge pump output current;
   coupling the second charge pump output voltage and the second charge pump output current to a second power supply input of a second functional circuit, the second functional circuit having a second power supply voltage requirement and a second power supply current requirement, wherein the first power supply voltage requirement is less than the second power supply voltage requirement and the first power supply current requirement is greater than the second power supply current requirement, and wherein the second charge pump output voltage meets the second power supply voltage requirement of the second functional circuit and the second charge pump output current meets the second power supply current requirement of the second functional circuit, wherein the first functional circuit, the second functional circuit, the first charge pump, and the second charge pump are on a single integrated circuit;

wherein the first power supply voltage varies across a range of voltage values;

wherein the first charge pump transitions between different modes of operation in response to different values of the first power supply voltage; and wherein the different modes of operation increase the first power supply voltage by different amounts to maintain the first charge pump output voltage above a minimum voltage.

2. The method of claim 1 wherein the first charge pump couples signals to a plurality of first capacitors and the second charge pump couples signals to a plurality of second capacitors, and wherein the first capacitors are external to the integrated circuit and the second capacitors are internal to the integrated circuit.

3. The method of claim 1 further comprising, regulating, by the first charge pump, the first charge pump output voltage.

4. The method of claim 3 wherein regulating comprises skipping one or more charge pump cycles.

5. The method of claim 3 further comprising regulating the second charge pump output voltage.

6. A circuit comprising:

a first sub-circuit, the first sub-circuit having a first power supply voltage requirement and a first power supply current requirement;

a second sub-circuit, the second sub-circuit having a second power supply voltage requirement and a second power supply current requirement, wherein the first power supply voltage requirement is less than the second power supply voltage requirement and the first power supply current requirement is greater than the second power supply current requirement;

first means for increasing a first power supply voltage received from a first power supply, said first means having a first output coupled to a first power supply input of the first sub-circuit to provide a first output voltage and a first output current, wherein the first output voltage is greater than the first power supply voltage, and wherein the first output voltage meets the first power supply voltage requirement of the first sub-circuit and the first output current meets the first power supply current requirement of the first sub-circuit; and second means for increasing the first output voltage coupled to the first output of the first means, the second means having a second output coupled to a second power supply input of the second sub-circuit to provide a second output voltage and a second current, wherein the second output voltage is greater than the first output voltage, and wherein the second output current is less than the first output current, and wherein the second output voltage meets the second power supply voltage requirement of the second sub-circuit and the second output current meets the second power supply current requirement of the second sub-circuit;

wherein the first sub-circuit, the second sub-circuit, the first means, and the second means are on a single integrated circuit;

wherein the first means comprises a plurality of first capacitors and the second means comprises a plurality of second capacitors, and wherein the first capacitors are external to the integrated circuit and the second capacitors are internal to the integrated circuit.

7. The circuit of claim 6 wherein the first means is a charge pump comprising a plurality of series connected transistors and a plurality of capacitors between said transistors.

* * * * *